(12) United States Patent
Shin et al.

(10) Patent No.: US 11,416,178 B2
(45) Date of Patent: Aug. 16, 2022

(54) MEMORY DEVICE PERFORMING PARALLEL CALCULATION PROCESSING, OPERATING METHOD THEREOF, AND OPERATING METHOD OF MEMORY CONTROLLER CONTROLLING THE MEMORY DEVICE

(71) Applicant: SAMSUNG ELECTRONICS CO., LTD., Suwon-si (KR)

(72) Inventors: Hyunsung Shin, Seoul (KR); Sanghyuk Kwon, Seoul (KR); Youngcheon Kwon, Hwaseong-si (KR); Sukhan Lee, Seoul (KR); Haesuk Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 91 days.

(21) Appl. No.: 17/014,667

(22) Filed: Sep. 8, 2020

(65) Prior Publication Data
US 2021/0216243 A1  Jul. 15, 2021

(30) Foreign Application Priority Data
Jan. 15, 2020 (KR) .................. 10-2020-0005604

(51) Int. Cl.
*G06F 3/06* (2006.01)
*G06N 3/02* (2006.01)

(52) U.S. Cl.
CPC .......... *G06F 3/0659* (2013.01); *G06F 3/0604* (2013.01); *G06F 3/0644* (2013.01); *G06F 3/0673* (2013.01); *G06N 3/02* (2013.01)

(58) Field of Classification Search
CPC .... G06F 3/0659; G06F 3/0604; G06F 3/0644; G06F 3/0673; G06F 3/061; G06F 3/0638; G06N 3/02; G06N 3/06
See application file for complete search history.

(56) References Cited

U.S. PATENT DOCUMENTS

| 5,860,130 A | 1/1999 | Yamanaka et al. |
| 7,750,915 B1 * | 7/2010 | Acocella ............. G06F 12/0607 |
| | | 345/543 |

(Continued)

FOREIGN PATENT DOCUMENTS

KR  10-2019-0100632 A  8/2019

*Primary Examiner* — Tracy A Warren
(74) *Attorney, Agent, or Firm* — Sughrue Mion, PLLC

(57) ABSTRACT

A memory device includes a memory bank including a plurality of banks, each including a memory cell array; a calculation logic including a plurality of processor-in-memory (PIM) circuits arranged in correspondence to the banks, each of the plurality of PIM circuits performing calculation processing using at least one selected from data provided from a host and information read from a corresponding bank among the banks; and a control logic configured to control a memory operation on the memory bank in response to a command and/or an address, each received from the host, or to control the calculation logic to perform the calculation processing, wherein reading operations are respectively performed in parallel on the banks for the calculation processing, offsets having different values are respectively configured for the banks, and information is read from different positions in respective memory cell arrays of the banks and provided to the PIM circuits.

20 Claims, 14 Drawing Sheets

(56) References Cited

U.S. PATENT DOCUMENTS

| | | | |
|---|---|---|---|
| 9,110,778 B2* | 8/2015 | Fleischer | ............... G06F 15/785 |
| 9,477,636 B2 | 10/2016 | Walker et al. | |
| 2017/0147608 A1 | 5/2017 | Zhang | |
| 2017/0358327 A1* | 12/2017 | Oh | ......................... G11C 29/48 |
| 2018/0267931 A1 | 9/2018 | Li et al. | |
| 2018/0276539 A1* | 9/2018 | Lea | ......................... G11C 11/54 |
| 2019/0057050 A1 | 2/2019 | Mathuriya et al. | |
| 2019/0258487 A1 | 8/2019 | Shin et al. | |
| 2020/0226201 A1* | 7/2020 | Ma | ......................... G06N 3/063 |
| 2021/0173893 A1* | 6/2021 | Luo | .................... G11C 13/0069 |

* cited by examiner

MEMORY DEVICE PERFORMING PARALLEL CALCULATION PROCESSING, OPERATING METHOD THEREOF, AND OPERATING METHOD OF MEMORY CONTROLLER CONTROLLING THE MEMORY DEVICE

CROSS-REFERENCE TO RELATED APPLICATION

This application claims priority to Korean Patent Application No. 10-2020-0005604, filed on Jan. 15, 2020, in the Korean Intellectual Property Office, the disclosure of which is incorporated herein in its entirety by reference.

BACKGROUND

The present disclosure relates to a memory device, and more particularly, to a memory device performing parallel calculation processing, an operating method thereof, and an operating method of a memory controller controlling the memory device.

The capacity and speed of semiconductor memory devices widely used in high-performance electronic systems have increased. Memory devices may be used to store various kinds of information such as data. For example, memory devices may be used to store data used for various kinds of calculation processing such as neural network computations or to store computing results. Approaches for performing at least some of computing operations using processor-in-memory (PIM) circuits of a memory device are suggested to efficiently perform a huge amount of computations.

PIM circuits may perform various kinds of calculation processing using data provided from outside and information stored in a memory device, and appropriate data and information related to various neural network functions need to be provided to the PIM circuits.

SUMMARY

Example embodiments provide a memory device allowing data and information needed for various neural network computations to be appropriately provided to processor-in-memory (PIM) circuits of the memory device, an operating method of the memory device, and an operating method of a memory controller controlling the memory device.

According to an aspect of example embodiment, there is provided a memory device including: a memory bank including a plurality of banks, each bank of the plurality of banks including a memory cell array, and the plurality of banks including at least a first bank and a second bank, the first bank including a first memory cell array and the second bank including a second memory cell array; a calculation logic including a plurality of processor-in-memory (PIM) circuits arranged in correspondence to the plurality of banks, the plurality of PIM circuits including at least a first PIM circuit arranged in correspondence to the first bank and a second PIM circuit arranged in correspondence to the second bank, and each of the plurality of PIM circuits being configured to perform a calculation processing using at least one selected from data provided from a host or memory information read from a corresponding bank among the plurality of banks; and a control logic configured to, based on at least one command or an address received from the host, control a memory operation on the memory bank, and control the calculation logic to perform the calculation processing, wherein the control logic is further configured to control in parallel at least a first reading operation from the first bank and a second reading operation from the second bank for the calculation processing, wherein a first offset for the first bank and a second offset for the second bank having different values are respectively configured for at least the first bank and the second bank, and wherein the memory operation is configured to: read first memory information from a first position in the first memory cell array and second memory information from a second position in the second memory cell array, and provide at least the first memory information to the first PIM circuit and the second memory information to the second PIM circuit.

According to an aspect of example embodiment, there is provided an operating method of a memory device including a plurality of banks and a plurality of processor-in-memory (PIM) circuits arranged in correspondence to the plurality of banks, each bank of the plurality of banks including a memory cell array, the plurality of banks including at least a first bank arranged in correspondence to a first PIM circuit and a second bank arranged in correspondence to a second PIM circuit, the first bank including a first memory cell array, the second bank including a second memory cell array, the first memory cell array including a first plurality of rows, and the second memory cell array including a second plurality of rows, the operating method including: configuring a plurality of offsets under control of a host, the plurality of offsets including a first offset for the first bank and a second offset for the second bank, and the first offset and the second offset having different values; receiving at least one of a command or an address from the host, the at least one of the command or the address being associated with a performance of calculation processing; generating a plurality of internal addresses based on a calculation using the address and the plurality of offsets, the plurality of internal addresses configured to access the plurality of banks, the plurality of internal addresses including a first internal address of the first memory cell array and a second internal address of the second memory cell array; reading first memory information from a first row of the first plurality of rows using the first internal address; reading second memory information from a second row of the second plurality of rows using the second internal address; and performing the calculation processing in parallel using at least the first PIM circuit and the second PIM circuit using the first memory information and the second memory information, respectively.

According to an aspect of example embodiment, there is provided an operating method of a memory controller controlling a memory device, the memory device including a plurality of banks and a plurality of processor-in-memory (PIM) circuits arranged in correspondence to the plurality of banks, the operating method including: controlling a memory operation configured to store a plurality of items of table information in the plurality of banks, the plurality of items of table information resulting from classifying information used for a neural network computation; calculating a plurality of offsets based on positions at which the plurality of items of table information are respectively stored in the plurality of banks, the plurality of offsets respectively having different values for the plurality of banks; configuring the plurality of offsets in the memory device, the plurality of offsets being calculated in correspondence to the plurality of banks; and controlling a calculation operation by providing at least one of a command or an address for calculation processing to the memory device, the calculation processing being configured to perform the calculation processing using information read from different positions in the plurality of banks based on the address and the plurality of offsets.

BRIEF DESCRIPTION OF THE DRAWINGS

Embodiments of the disclosure will be more clearly understood from the following detailed description taken in conjunction with the accompanying drawings in which.

DETAILED DESCRIPTION

Hereinafter, example embodiments will be described in detail with reference to the accompanying drawings.

Figure 1:
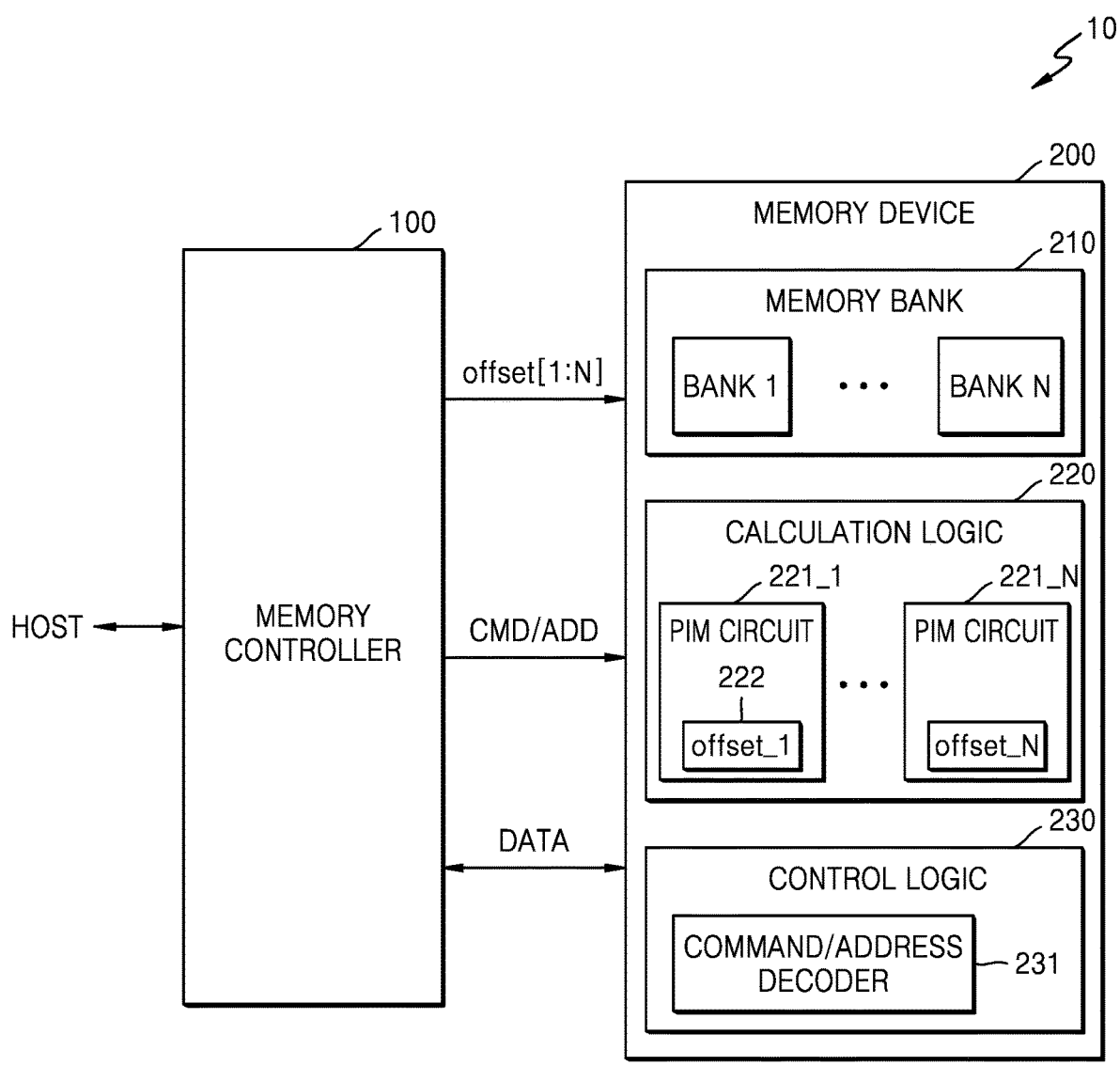
FIG. 1 is a block diagram of a memory system including a memory device, according to an example embodiment.

FIG. 1 is a block diagram of a memory system including a memory device, according to an example embodiment.

Referring to FIG. 1, a memory system 10 may include a memory controller 100 and a memory device 200. The memory controller 100 may include a memory interface and provide various signals to the memory device 200 through the memory interface to control memory operations such as writing and reading. For example, the memory controller 100 may provide a command CMD and an address ADD to the memory device 200 and access data of the memory device 200.

The memory controller 100 may access the memory device 200 at the request of a host. The memory controller 100 may communicate with the host using various protocols. For example, the memory controller 100 may communicate with the host using an interface protocol such as a peripheral component interconnect-express (PCI-E) protocol, an advanced technology attachment (ATA) protocol, a serial ATA (SATA) protocol, a parallel ATA (PATA) protocol, or a serial attached small computer small interface (SCSI) (SAS) protocol. Besides those above, other various interface protocols such as a universal serial bus (USB) protocol, a multimedia card (MMC) protocol, an enhanced small disk interface (ESDI) protocol, and an integrated drive electronics (IDE) protocol may be used as protocols between the host and the memory controller 100.

According to example embodiments, the memory controller 100 may correspond to the host or a configuration included in the host. The host and the memory device 200 may form a data processing system, and accordingly, the memory system 10 may correspond to a data processing system or may be defined as a configuration included in the data processing system.

The memory device 200 may include a memory bank 210, a calculation logic 220, and a control logic 230. The memory bank 210 may include a plurality of banks, e.g., first through N-th banks BANK 1 through BANK N, each of which may include a memory cell array including a plurality of memory cells. The calculation logic 220 may include at least one processor-in-memory (PIM) circuit. Although the calculation logic 220 includes N PIM circuits, e.g., first through N-th PIM circuits 221_1 through 221_N, in correspondence to the N banks of the memory bank 210 in FIG. 1, the calculation logic 220 may include various numbers of PIM circuits. For example, when a plurality of PIM circuits are provided for a single bank, the number of PIM circuits may be greater than the number of banks. Contrarily, when a single PIM circuit is shared by at least two banks, the number of PIM circuits may be less than the number of banks. Each PIM circuit may perform calculation processing using one or more bits of data from the host and one or more bits of information read from the memory device 200.

The control logic 230 may include a command/address decoder 231. The command/address decoder 231 may decode the command CMD and/or the address ADD from the memory controller 100, and the control logic 230 may perform an internal control operation on the memory device 200 such that a memory operation is performed according to a decoding result. When calculation processing in the memory device 200 is controlled by the memory controller 100, the control logic 230 may perform an internal control operation on the memory device 200 such that a calculation processing operation is performed according to a decoding result.

The memory device 200 may include dynamic random access memory (DRAM) such as double data rate synchronous DRAM (DDR SDRAM), low power DDR (LPDDR) SDRAM, graphics DDR (GDDR) SDRAM, or Rambus DRAM (RDRAM). However, embodiments are not necessarily limited thereto. For example, the memory device 200 may include non-volatile memory such as flash memory, magnetic RAM (MRAM), ferroelectric RAM (FeRAM), phase-change RAM (PRAM), or resistive RAM (ReRAM).

The memory device 200 may correspond to a single semiconductor chip or to a single channel in a memory device including a plurality of channels having an independent interface. Alternatively, the memory device 200 may correspond to a memory module or to a single memory chip mounted on a module board when a memory module includes a plurality of memory chips.

Hereinafter, an example of a calculation processing operation performed in the memory device 200 will be described according to example embodiments. Various kinds of calculation processing operations may be performed in the memory device 200. For example, at least some of neural network computations related to artificial intelligence may be performed in the memory device 200. For example, the host may control the memory device 200 through the memory controller 100 such that at least some of neural network computations are performed by the memory device 200. Although the memory controller 100 controls the memory device 200 in the embodiments described below, embodiments are not necessarily limited thereto. For example, the memory controller 100 may correspond to a configuration included in the host, and the host may control the memory device 200.

Assuming that the number of first through N-th PIM circuits 221_1 through 221_N of the calculation logic 220 is the same as the number of banks of the memory bank 210, each PIM circuit of the calculation logic 220 may perform calculation processing using information read from a corresponding bank. Each of the first through N-th PIM circuits 221_1 through 221_N of the calculation logic 220 may include a calculator and a storage circuit storing certain information. For example, each of the first through N-th PIM circuits 221_1 through 221_N may include a register that stores information used for a calculation and/or a calculation result.

In an example operation, data from the memory controller 100 may be provided in common to the first through N-th PIM circuits 221_1 through 221_N, and the first through N-th PIM circuits 221_1 through 221_N may perform calculation processing using the data in common. In addition, different information may be read from the first through N-th banks BANK 1 through BANK N and provided to the first through N-th PIM circuits 221_1 through 221_N, and accordingly, the first through N-th PIM circuits 221_1 through 221_N may perform calculation processing using the same data and different information.

According to an example embodiment, the first through N-th PIM circuits 221_1 through 221_N may perform parallel calculation processing, and accordingly, read operations respectively on the first through N-th banks BANK 1 through BANK N may be performed in parallel. For example, the memory cell array of each bank may include a plurality of rows, various kinds of information necessary for calculation processing may be stored in the rows of the first through N-th banks BANK 1 through BANK N in a distributed manner, and information provided to the calculation logic 220 may be read from different rows in the respective memory cell arrays of the first through N-th banks BANK 1 through BANK N.

According to an example embodiment, the calculation logic 220 may include an offset storage circuit, which stores offsets, e.g., first through N-th offsets offset_1 through offset_N, respectively corresponding to the first through N-th banks BANK 1 through BANK N. As shown in FIG. 1, the offset storage circuit may be arranged in each of the first through N-th PIM circuits 221_1 through 221_N and store an offset of a corresponding bank. For example, the first PIM circuit 221_1 may include a storage circuit 222, which stores the first offset offset_1 corresponding to the first bank BANK 1. The offset storage circuit may include various types of storage circuits, e.g., registers.

The command/address decoder 231 may decode the command CMD and/or the address ADD from the memory controller 100. For example, the address ADD may be provided from the control logic 230 to the calculation logic 220, and each of the first through N-th PIM circuits 221_1 through 221_N may generate an internal address using the address ADD from the memory controller 100 and an offset stored therein, wherein the internal address indicates a read position in the memory cell array of a corresponding one of the first through N-th banks BANK 1 through BANK N. For example, each of the first through N-th PIM circuits 221_1 through 221_N may include an internal address generator, which generates the internal address by performing a calculation using the address ADD and the offset. Because the offset is differently configured for each bank, internal addresses may be generated to indicate different positions (e.g., different rows) in the respective memory cell arrays of the first through N-th banks BANK 1 through BANK N.

In an example operation, a start position of a read operation on the memory cell array of each bank may be defined based on an internal address generated using an offset. A neural network computation may include a huge amount of calculations. A plurality of rows of the memory cell array may be sequentially read in response to the command CMD and/or the address ADD, each instructing to perform calculation processing. Each PIM circuit may perform calculation processing based on data from the memory controller 100 and at least one item of information read from a corresponding bank. For example, information may be sequentially read from at least one row of each of the first and second banks BANK 1 and BANK 2 starting from different rows of the first and second banks BANK 1 and BANK 2, and information read from the first bank BANK 1 may be provided to the first PIM circuit 221_1 and information read from the second band BANK 2 may be provided to the second PIM circuit 221_2.

According to the example embodiment described above, in the memory device 200 performing a plurality of calculation processing based on matrix-vector in parallel, it may be possible to configure offsets such that a significant number of random vectors are simultaneously processed in parallel. For example, as for a matrix-vector based calculation, when a matrix corresponding to the data is constant and information corresponding to a vector is stored in a distributed manner in a plurality of rows in the respective memory cell arrays of the first through N-th banks BANK 1 through BANK N, information corresponding to the vector may be read from an appropriate position in each of the first through N-th banks BANK 1 through BANK N and provided to the calculation logic 220 in parallel.

Offset configuration in the memory device 200 may be controlled by the memory controller 100. The memory controller 100 may provide various signals for the offset configuration to the memory device 200. In an example operation, the memory controller 100 may exchange data with the memory device 200 through a data bus, and offset information offset[1:N] corresponding to the first through N-th banks BANK 1 through BANK N may be provided to the memory device 200 through the data bus. The command CMD and/or the address ADD instructing to perform offset configuration may be variously defined. For example, offset configuration may be performed by defining a command separately from a normal memory operation or defining an address having a different value than an address range for a normal memory operation. Alternatively, the memory device 200 may include a mode register set (MRS) for setting modes of various circuits in the memory device 200, and a command for offset configuration may be defined using a mode register command from the memory controller 100.

The command CMD and/or the address ADD instructing to perform calculation processing may also be variously defined. For example, calculation processing may be performed using the command CMD and/or the address ADD each related to an existing memory operation such as data write and/or read, or a calculation command may be defined independently of a normal memory operation. The memory device 200 may selectively perform a memory operation or a calculation processing operation based on a decoding operation on the command CMD and/or the address ADD.

The calculation logic 220 may be variously defined, and accordingly, a PIM circuit corresponding to each bank may include various elements. A PIM circuit may include a calculator. Examples of the calculator may include a single instruction multi data (SIMD) unit and an arithmetic logic unit (ALU). A PIM circuit may further include a register or an internal address generator, as described above. The calculation logic 220 may include other various elements related to calculation processing. For example, various elements such as a controller controlling all operations of calculation processing, an instruction memory (or an instruction queue) storing instructions related to a calculation, and a decoder decoding an instruction may be included in the calculation logic 220.

The memory system 10 may process various kinds of data. According to an embodiment, when the memory device 200 performs neuromorphic computing, the memory device 200 may be referred to as a neuromorphic device or a neuromorphic chip. Generally, neuromorphic computing may refer to use of circuits and/or software to implement models of human neural systems. When the memory device 200 corresponds to a neuromorphic device, the memory device 200 may include, as hardware components, a neuron circuit and a synapse circuit, which respectively correspond to a neuron and a synapse in the human nervous system. For example, the elements of the memory bank 210 and the elements of the calculation logic 220 may form the neuron circuit and the synapse circuit. According to an example implementation, a synapse circuit may store weight information and perform a weight multiplication through memristor-based design, and the memory bank 210 may include a memristor-based memory array.

The memory system 10 or a data processing system including the memory system 10 may include a personal computer (PC), a data server, a cloud system, an artificial intelligence server, a network-attached storage (NAS), an interne of things (IoT) device, or a portable electronic device. When the data processing system is a portable electronic device, the data processing system may include a laptop computer, a cellular phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, or a wearable device.

Figure 2:
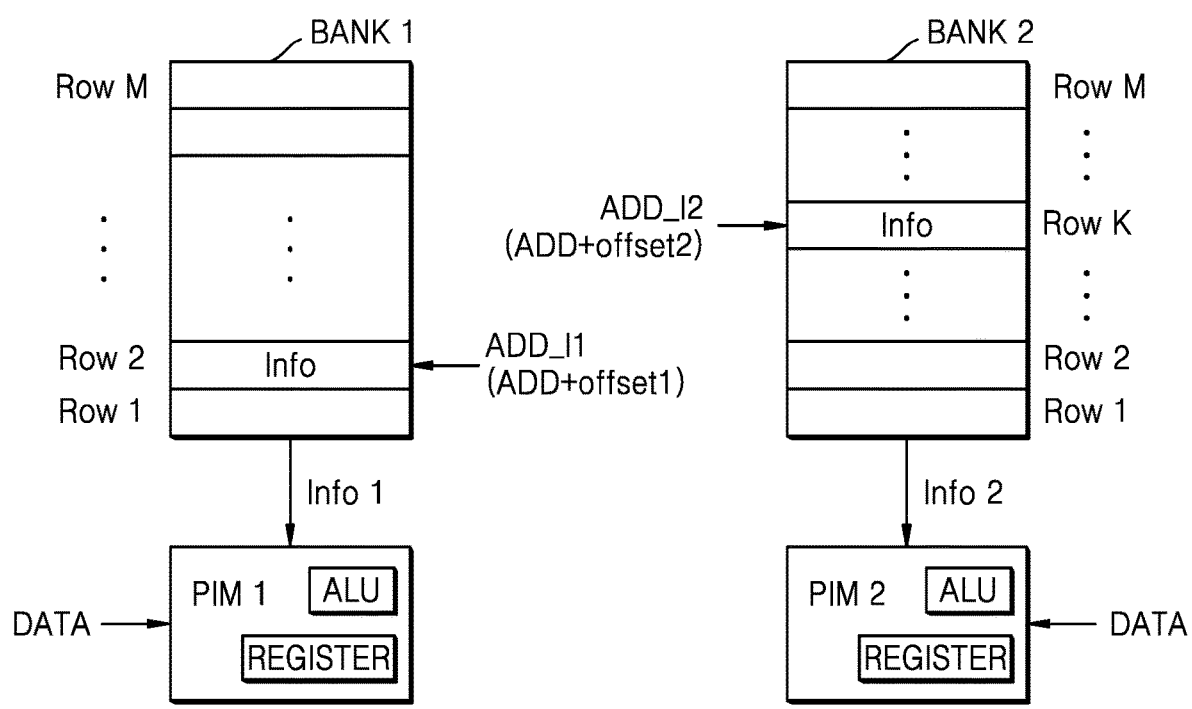
FIG. 2 is a conceptual diagram illustrating an example of reading information from a plurality of banks in FIG. 1.

FIG. 2 is a conceptual diagram illustrating an example of reading information from a plurality of banks in FIG. 1. FIG. 2 shows an example of a read operation performed on the first bank BANK 1 and the second bank BANK 2.

Referring to FIGS. 1 and 2, the address ADD from the memory controller 100 may be provided in common to the first bank BANK 1 and the second bank BANK 2, and the internal address generator of the memory device 200 may generate an internal address by applying a different offset to the address ADD for each bank. For example, the memory device 200 may generate a first internal address ADD_11 for accessing the first bank BANK 1 by applying the first offset, offset 1, to the address ADD and generate a second internal address ADD_12 for accessing the second bank BANK 2 by applying the second offset, offset 2, to the address ADD.

According to offsets applied for the first bank BANK 1 and the second bank BANK 2, information may be read from different rows respectively of the first bank BANK 1 and the second bank BANK 2. For example, an internal address may be generated based on the sum of the address ADD and an offset configured for each bank. FIG. 2 illustrates an example in which information "Info 1" is read from a second row Row 2 of the first bank BANK 1 based on the first internal address ADD 11 and provided to a first PIM circuit PIM 1 and information "Info 2" is read from a K-th row Row K of the second bank BANK 2 based on the second internal address ADD 12 and provided to a second PIM circuit PIM 2. Accordingly, the first PIM circuit PIM 1 and the second PIM circuit PIM 2 may perform calculation processing on the same data (for example, same matrix) using different information (for example, different vectors). According to an example embodiment, each of the first PIM circuit PIM 1 and the second PIM circuit PIM 2 may include a calculator, e.g. an ALU, and a register; and a calculation processing result may be stored in the register.

A configuration for generating an internal address using an offset and the address ADD from the memory controller 100 may be variously implemented. For example, an internal address generator may be provided in common for a plurality of banks and may generate internal addresses respectively corresponding to the banks using the address ADD and a plurality of offsets respectively corresponding to the banks. Alternatively, an internal address generator may be provided for an each of a plurality of banks and may generate an internal address using the address ADD from the memory controller 100 and an offset configured for a corresponding bank.

Figure 3:
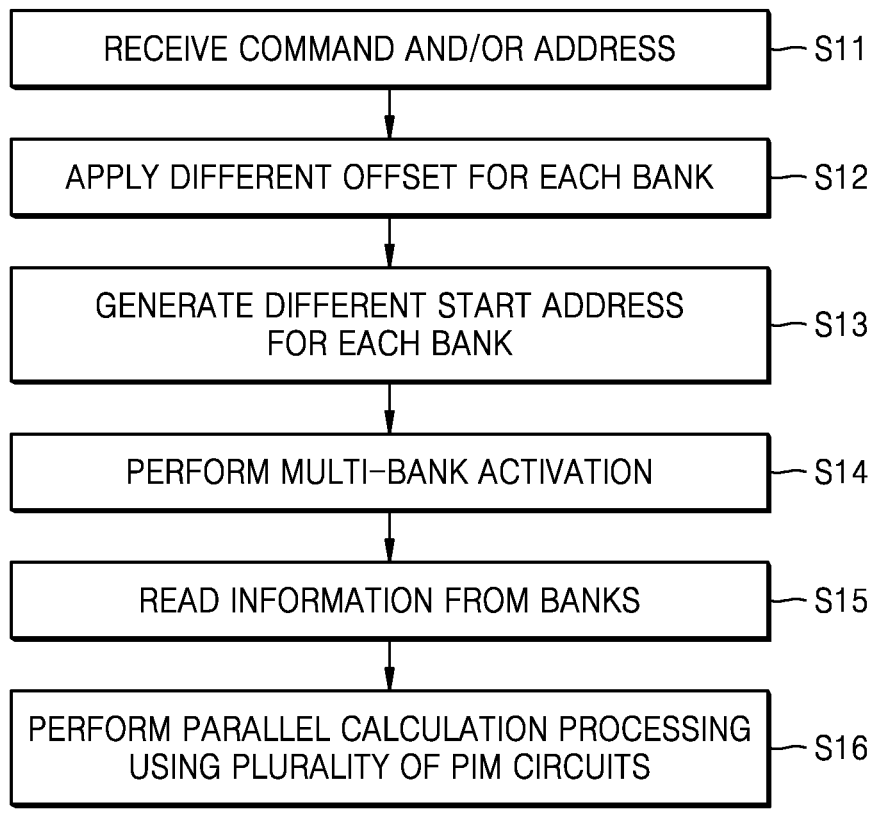
FIG. 3 is a flowchart of an operating method of a memory device, according to an example embodiment.

FIG. 3 is a flowchart of an operating method of a memory device, according to an example embodiment.

Referring to FIG. 3, the memory device may be subjected to various controls of a host (or a memory controller), which are related to calculation processing. For example, the memory device may receive instructions for various kinds of calculation processing in advance and store the instructions in a certain storage circuit (e.g., an instruction memory). For example, various kinds of calculations may be sequentially performed for a neural network function of analyzing an image file or an audio file, and instructions for predefining the calculations may be provided from the host to the memory device. The memory device may perform calculation processing by its own determination or in response to a request of the memory controller. For example, the memory device may sequentially read the stored instructions during each calculation processing operation and sequentially perform, based on the result of decoding the instructions, calculation processing operations according to a preset sequence.

Assuming that calculation processing is performed based on a command and/or an address from a host, a memory device may receive a command and/or an address, each instructing to perform calculation processing, in operation S11 and may access a plurality of banks based on the address. For example, a plurality of offsets may be respectively defined for the banks, and at least two of the offsets may have different values from each other.

The memory device may apply a different offset to the address for each bank in operation S12, thereby generating a plurality of internal addresses for accessing the banks. For example, when a plurality of rows of each bank are sequentially accessed in response to the command and/or address from the host, start addresses having different values for the respective banks may be generated as the internal addresses in operation S13.

To read data in parallel from the banks, multi-bank activation may be performed based on the internal addresses in operation S14, and information may be read from the activated banks in operation S15. For example, rows at different positions in the banks may be activated, and information may be read from at least one row starting from the activated row in each bank, wherein the address of the activated row is a start address. Generally, row activation in a DRAM provides access to stored information in a particular row of the DRAM. Specifically, row activation in some embodiments moves charge from DRAM charge storage locations (such as effective capacitors) into the sense amplifiers associated with the row. When a plurality of PIM circuits are provided respectively for the banks, information read from each of the banks may be provided to a corresponding PIM circuit, and the PIM circuits may perform parallel calculation processing using the received information in operation S16. For example, the PIM circuits may receive the same data from a memory controller (or the host) at the same time, and each of the PIM circuits may receive different information read from a corresponding one of the banks. Accordingly, the PIM circuits may receive the same data and respectively generate outputs respectively having different values.

Figure 4:
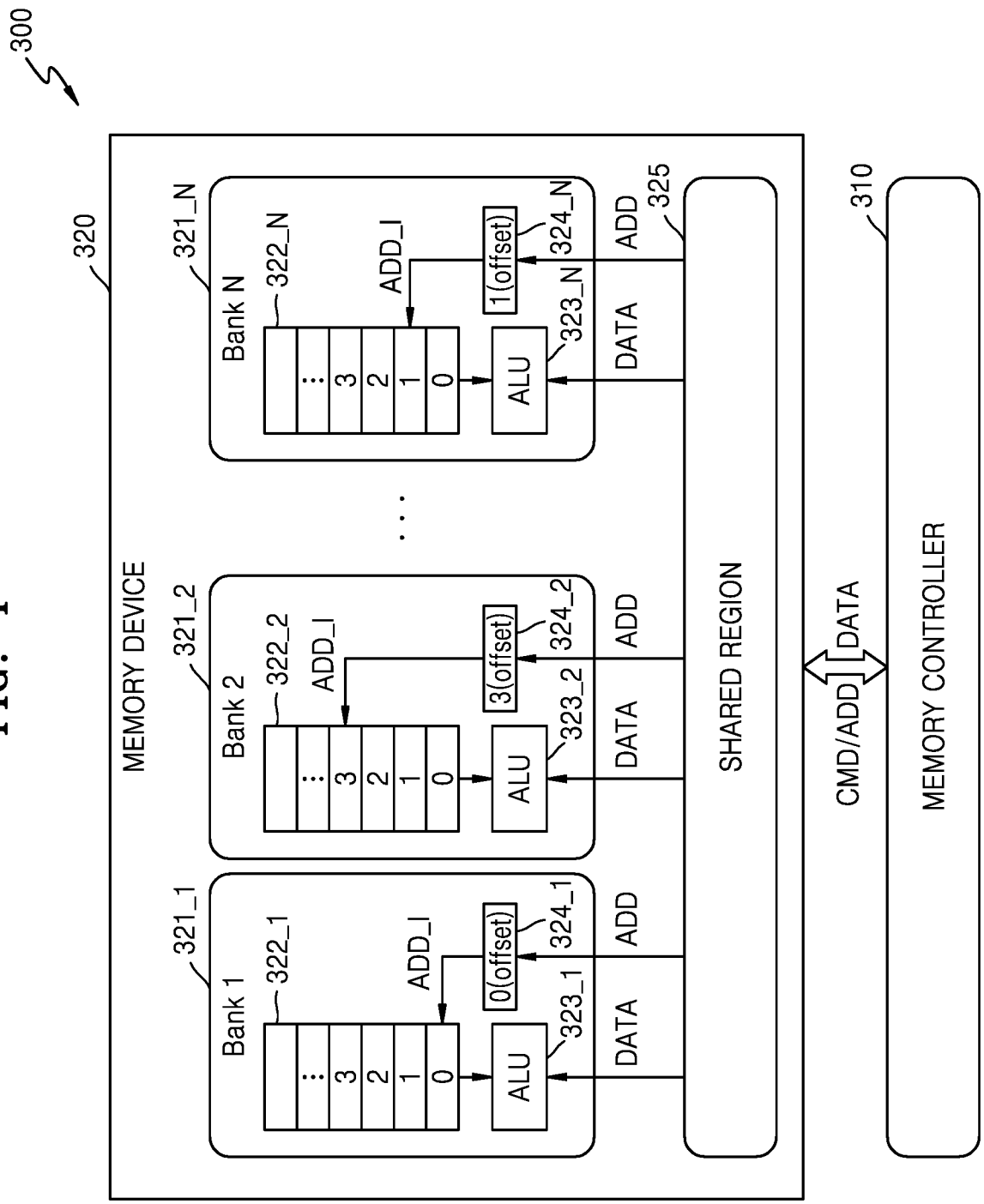
FIG. 4 is a block diagram illustrating implementation of a memory device and a memory system, according to an embodiment.

FIG. 4 is a block diagram illustrating implementation of a memory device and a memory system, according to an embodiment.

Referring to FIG. 4, a memory system or a data processing system 300 may include a memory controller 310 and a memory device 320. The memory device 320 may include first through N-th banks 321_1 through 321_N, which may respectively include memory cell arrays 322_1 through 322_N. Each of the memory cell arrays 322_1 through 322_N may include a plurality of rows.

According to an example embodiment, a bank may include various elements. Although a calculation logic including PIM circuits is provided outside a bank in the embodiments described above, at least some elements of each PIM circuit may be included in the bank. For example, the first bank 321_1 further includes a calculator, e.g., a first ALU 323_1, for calculation processing and an internal address generator 324_1 generating an internal address ADD_1 in addition to the memory cell array 322_1 in FIG. 4. However, other elements may be further included in a bank. Although it is illustrated in FIG. 4 that a storage circuit storing an offset configured for a bank is included in an internal address generator, the storage circuit may be provided outside the internal address generator.

The memory controller 310 may provide the memory device 320 with data and the command CMD and/or the address ADD, which are used for calculation processing. The memory device 320 may include a shared region 325 including at least one circuit configuration shared by the first through N-th banks 321_1 through 321_N. For example, a control logic described above, a command/address buffer, or the like may be included in the shared region 325. The shared region 325 may further include a way selection circuit for communication between the first through N-th banks 321_1 through 321_N and the memory controller 310.

Various signals related to calculation processing may be provided to the first through N-th banks 321_1 through 321_N through the shared region 325. For example, data from the memory controller 310 may be provided to first through N-th ALUs 323_1 through 323_N respectively included in the first through N-th banks 321_1 through 321_N, and the address ADD from the memory controller 310 may be provided to internal address generators 324_1 through 324_N respectively included in the first through N-th banks 321_1 through 321_N.

Each of the first through N-th banks 321_1 through 321_N may select a read position in a memory cell array thereof using the address ADD and an offset therein. For example, assuming that an offset configured in the first bank 321_1 has a value of 0, an offset set in the second bank 321_2 has a value of 3, and the address ADD has a value indicating a position of a first row "0" in a memory cell array, information stored in the first row "0" in the memory cell array 322_1 of the first bank 321_1 may be read and provided to the first ALU 323_1 and information stored in a fourth row "3" in the memory cell array 322_2 of the second bank 321_2 may be read and provided to the second ALU 323_2. Accordingly, the first ALU 323_1 and the second ALU 323_2 may receive the same data and perform calculation processing using information stored in different rows in the first and second banks 321_1 and 321_2, respectively.

When information is sequentially read from a plurality of rows in each bank for calculation processing, information may be sequentially read from a certain number of rows starting from the first row "0" in the first bank 321_1 and information may be sequentially read from a certain number of rows starting from the fourth row "3" in the second bank 321_2.

In the embodiment illustrated in FIG. 4, the shared region 325 may further include a command/address decoder. In a normal memory operation, according to a command/address decoding result, data is read from a row indicated by the address ADD from the memory controller 310, without applying an offset to the address ADD.

Figure 5:
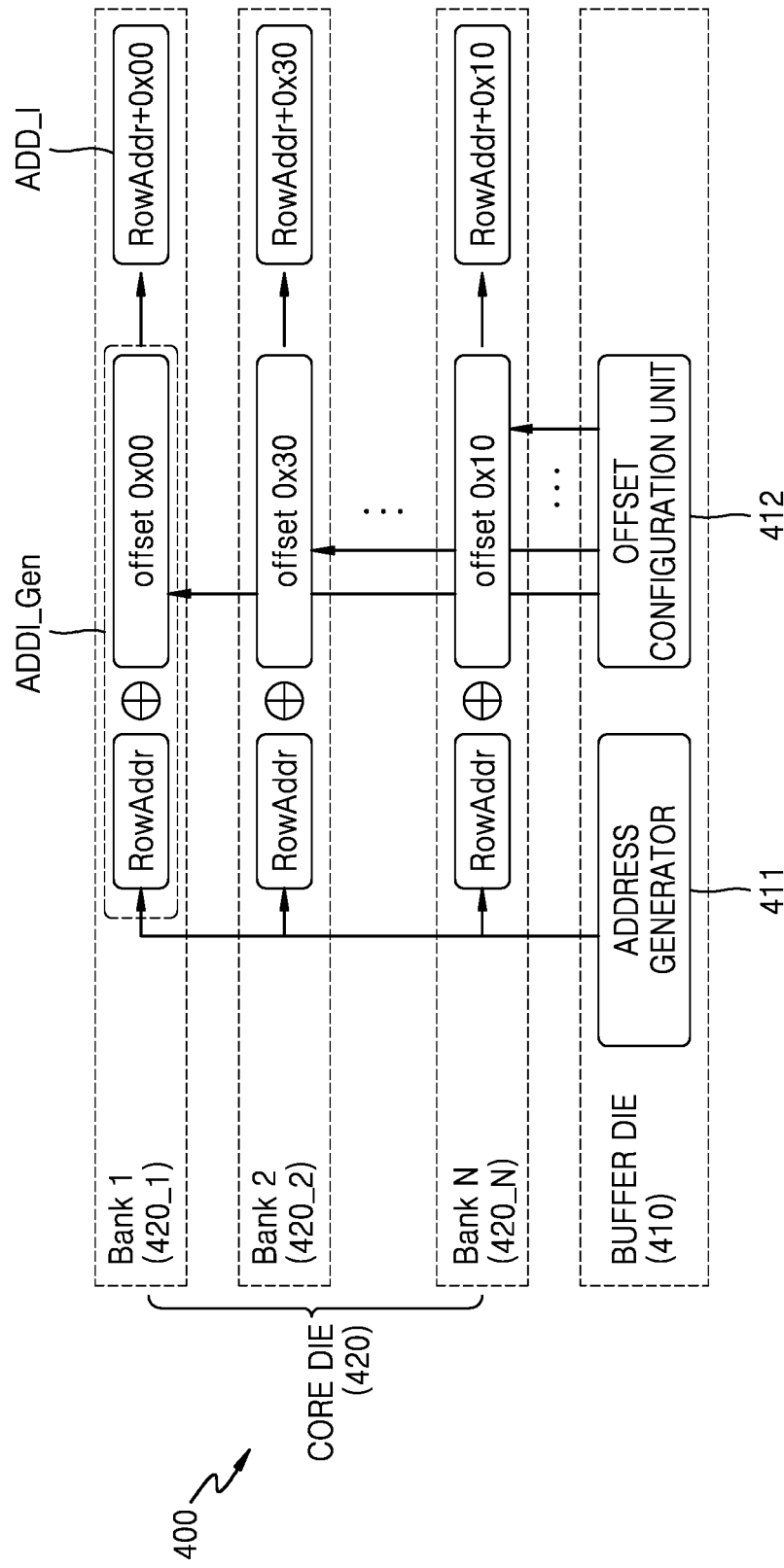
FIG. 5 is a conceptual diagram of a procedure for generating an internal address, according to an example embodiment.

FIG. 5 is a conceptual diagram of a procedure for generating an internal address, according to an example embodiment. A memory device may include at least one die. For example, a memory device may include a die (e.g., a buffer die) managing or controlling a memory operation and at least one die (e.g., a core die) including a memory cell array (or a memory bank).

Referring to FIG. 5, a memory device 400 may include a buffer die 410 and a core die 420. The buffer die 410 may include an address generator 411 and an offset configuration unit 412. The buffer die 410 may communicate with an external host or a memory controller and may control a memory operation and a calculation processing operation of the core die 420 based on a result of decoding a command and/or an address from the host. The core die 420 may include first through N-th banks 420_1, 420_2, through 420_N. The buffer die 410 may receive control signals related to offset configuration from the host, and the offset configuration unit 412 may control the offset configuration of the first through N-th banks 420_1 through 420_N based on the control signals. In an example of FIG. 5, exemplary offsets of 0x00, 0x30 and 0x10 are shown for three of the N banks.

In an example operation, the address generator 411 may provide an address from a host to the first through N-th banks 420_1 through 420_N of the core die 420. For example, a row address RowAddr included in the address from the host may be provided to the first through N-th banks 420_1 through 420_N for the generation of internal addresses described above. Each of the first through N-th banks 420_1 through 420_N may include an internal address generator ADDI_Gen, which may generate the internal address ADD_I by performing a calculation (e.g., an addition) using an offset and the row address RowAddr generated from the address from the host. Because different offsets are configured for the first through N-th banks 420_1 through 420_N, internal addresses ADD_I respectively generated from the first through N-th banks 420_1 through 420_N may have different values from each other. Accordingly, information may be read from different rows in the respective memory arrays of the first through N-th banks 420_1 through 420_N.

Figures 6, 7A:
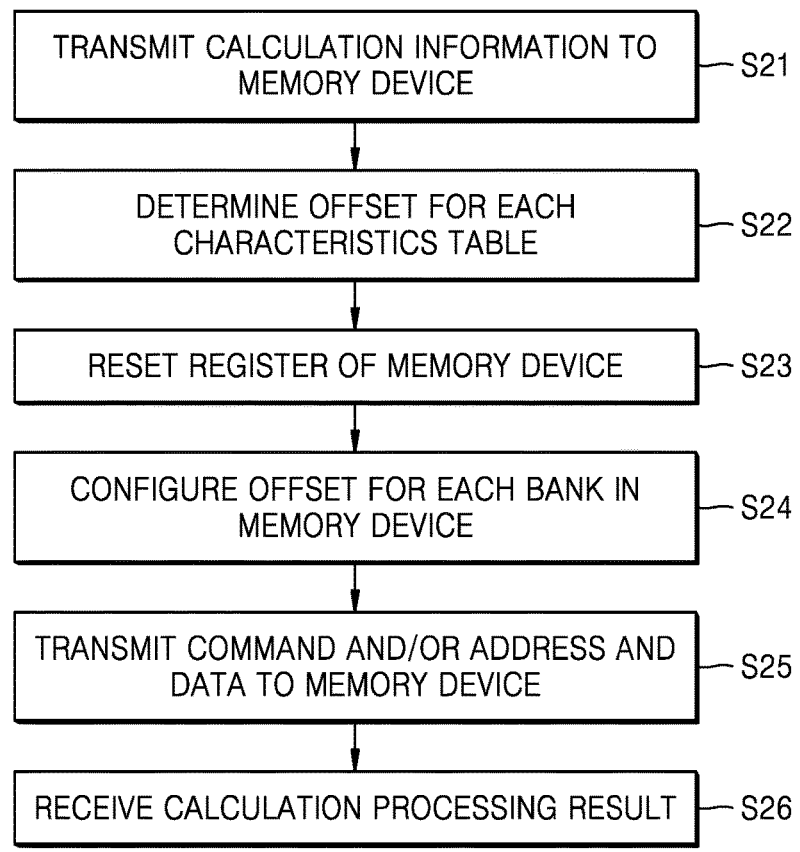
FIG. 6 is a diagram illustrating an example of a calculation operation performed according to an example embodiment.
FIGS. 7A and 7B are diagrams illustrating an operating method of a memory system, according to an example embodiment.

FIG. 6 is a diagram illustrating an example of a calculation operation performed according to an example embodiment.

For neural network computation such as deep learning, an artificial neural network may be constructed, and a multiplication and accumulation (MAC) operation, in which a vector (or an input vector) is multiplied by a weight matrix and multiplication results are added up, may be mainly performed in the artificial neural network. For example, a matrix vector operation may be written as Ax=b, where A is a weight matrix, x is an input vector with a number of elements equal to the number of columns of A, and b is an output vector with a number of elements equal to the number of rows of A. FIG. 6 shows an example in which each of the first bank BANK 1 and the second bank BANK 2 performs a matrix-vector calculation using a vector and a weight matrix.

For example, data DATA 1 through DATA H corresponding to a weight matrix may be provided from a host to a memory device, information read from respective memory cell arrays of a plurality of banks based on offsets may form a vector. For example, when a function of analyzing a file such as an image file or an audio file is performed according to a neural network computation, a vector read from a plurality of banks may include information of the file. In other words, to determine the characteristic of a file, information of the file may be classified into items of table information according to various characteristics and stored in the banks. When an output (e.g., a neural network computation result) is generated by performing a weight multiplication on an input, the information stored in the banks may correspond to the input.

As shown in FIG. 6, according to embodiments, calculations may be performed in parallel by a plurality of PIM circuits arranged in correspondence to a plurality of banks. For example, the data DATA 1 through DATA H forming a weight matrix from a host may be provided in common to the first bank BANK 1 and the second bank BANK 2, a vector may be read from different rows in respective memory cell arrays of the first bank BANK 1 and the second bank BANK 2, and a matrix-vector calculation may be performed. FIG. 6 shows an example in which a vector is read from a first row Row 1 of the first bank BANK 1 and a vector is read from a third row Row 3 of the second bank BANK 2, according to offsets.

According to the matrix-vector calculation described above, different calculation results may be generated from a plurality of banks using the same weight matrix. For example, a first calculation result Result 1 generated from the first bank BANK 1 (or a PIM circuit of the first bank BANK 1) may be different from a second calculation result Result 2 generated from the second bank BANK 2 (or a PIM circuit of the second bank BANK 2).

Figure 7B:
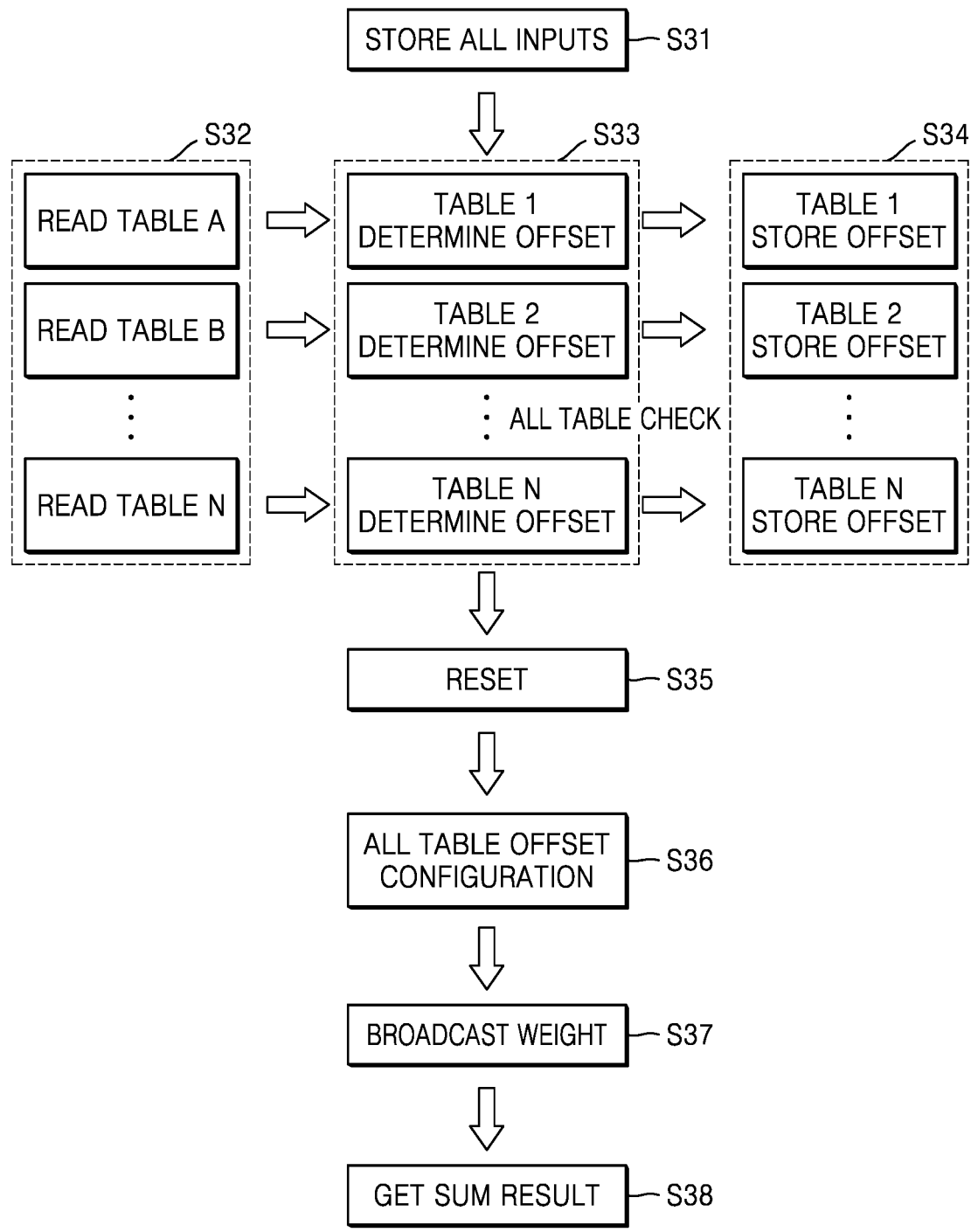

FIGS. 7A and 7B are diagrams illustrating an operating method of a memory system, according to an example embodiment. An example operation of a memory controller (or a host) included in the memory system is described with reference to FIGS. 7A and 7B. As described above, the memory system may be referred to as a data processing system. The host may control a memory device, which includes a plurality of banks and a plurality of PIM circuits corresponding to the banks.

Referring to FIG. 7A, various artificial intelligence functions including analysis of a file such as an image file or an audio file may be performed according to a neural network computation, and information (e.g., calculation information) including file information used for the neural network computation may be transmitted from the memory controller to the memory device in operation S21. To analyze the file, the calculation information may be classified into a plurality of characteristics tables, and calculations may be performed using weight information and calculation information included in the characteristics tables. The host may control an operation of storing the calculation information, which is classified into the characteristics tables, in the memory device. In an example operation, the host may store the characteristics tables of the calculation information in different banks.

The memory controller may determine an offset for each characteristics table when storing the calculation information in the memory device in operation S22. For example, for a neural network computation, calculation processing may be performed using weight information and calculation information of various characteristics tables, and the calculation information may be stored in rows of a plurality of banks in a distributed manner. At this time, the calculation information may be stored in different positions in the banks to undergo the calculation processing, and the memory controller may determine offsets based on the stored positions of the calculation information.

The memory controller may perform a control operation of resetting a register of each PIM circuit of the memory device to perform calculation processing in operation S23 and may configure an offset determined for each bank in the memory device in operation S24. For example, the memory device may include a plurality of PIM circuits arranged in correspondence to the banks, and an offset storage circuit storing an offset may be provided in each PIM circuit. The memory controller may perform a control operation of storing the determined offset in an offset storage circuit of each PIM circuit.

Thereafter, the memory controller may perform a control operation such that at least some calculations included in the neural network computation are performed in the memory device. For example, the memory controller may transmit a command and/or an address instructing to perform a calculation operation, and data used for the calculation operation to the memory device in operation S25. For example, the data from the memory controller may be provided in common to the banks of the memory device. According to the embodiments described above, the PIM circuits may perform the calculation processing using the same data and different calculation information, and each PIM circuit may store a calculation result in a register thereof. The memory controller may receive a calculation processing result from the memory device in operation S26.

FIG. 7B is a conceptual diagram illustrating the overall flow of calculation processing performed by a memory system.

Operation S31, in which all inputs are stored in a memory device, may refer to the operation of storing the calculation information described above in a plurality of banks of the memory device. As described above, the memory controller may determine the storage positions of the characteristics tables of the calculation information in the memory device when storing the calculation information in the memory device and may perform the offset determining operation described above based on the storage positions. Operation S32 refers to a procedure for reading the calculation information classified into the characteristics tables for offset calculation and refers to functions of "read table A," "read table B," . . . and "read table N." An offset is determined with respect to each characteristics table in operation S33 ("table 2 determine offset," "table 2 determine offset," . . . "table N determine offset"). The offset determined with respect to each characteristics table is stored in the memory controller in operation S34 ("table 1 store offset," "table 2 store offset," and "table N store offset").

Operation S35 refers to an operation of resetting a register included in each PIM circuit of the memory device for the calculation processing according to the embodiments described above. Operation S36 refers to an operation of storing or configuring an offset for each characteristics table in the memory device. The memory controller may provide a command and/or an address for the calculation processing to the memory device and may also provide data to the memory device. Operation S37 refers to an operation of transmitting (or broadcasting) in common weight information as the data to all banks of the memory device. The memory controller may provide a certain command and/or address to the memory device and receive calculation results. Operation S38 refers to an operation of receiving the sum of a plurality of results of multiplying the data by the calculation information.

FIGS. 8A, 8B, 9A, and 9B are block diagrams illustrating examples of recording an offset in a memory device, according to various embodiments. A memory device may include a plurality of banks and a plurality of PIM circuits corresponding to the banks, according to the embodiments described above.

Figure 8A:
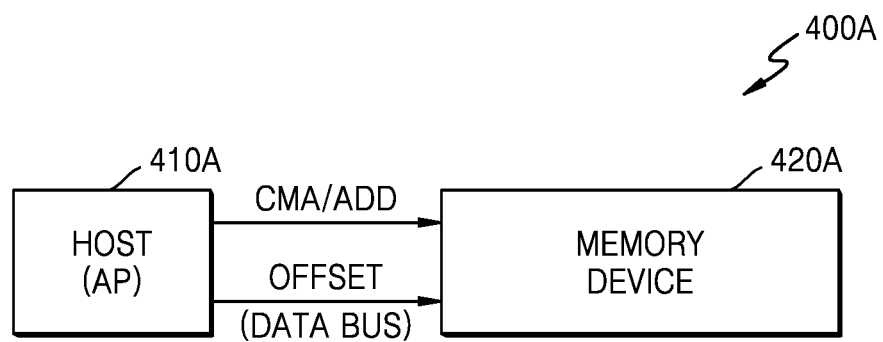
FIGS. 8A, 8B, 9A, and 9B are block diagrams illustrating examples of recording an offset in a memory device, according to various embodiments.
Figure 8B:
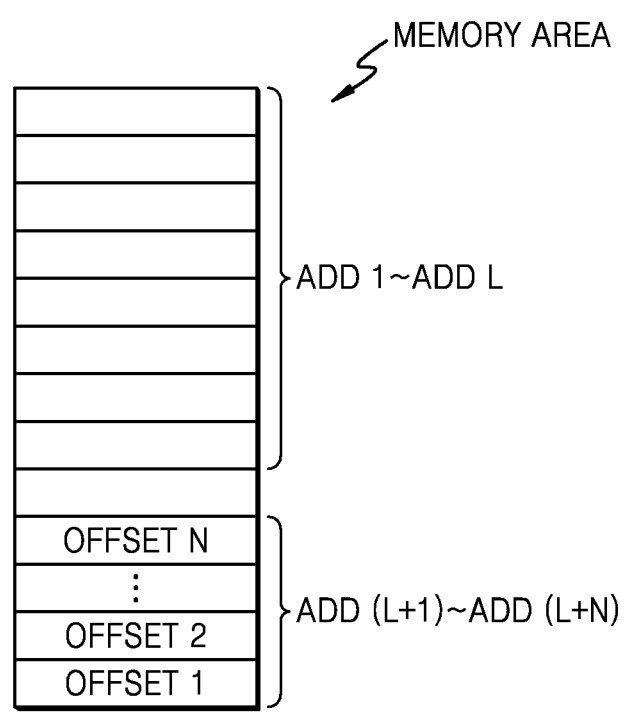

Referring to FIGS. 8A and 8B, a memory system 400A may include a host 410A and a memory device 420A. For example, the host 410A may include an application processor (AP).

Various commands and/or addresses may be defined to store offsets in the memory device 420A. For example, a memory area of a memory cell array included in the memory system 400A may be indicated by a certain range of addresses, as shown in FIG. 8B. For example, a memory operation on the memory area may be controlled by a certain address range of ADD 1 to ADD L, and another address range of, for example, ADD (L+1) to ADD (L+N), than the certain address range may be defined to instruct to store an offset. In other words, the memory system 400A may instruct to store an offset based on a command related to a normal memory operation and may perform a memory operation or an offset recording operation according to a result of decoding the command CMD and/or the address ADD from the host 410A.

The host 410A may transmit an offset to the memory device 420A through various transmission paths. For example, the host 410A may exchange data for a memory operation with the memory device 420A through a data bus. When the host 410A provides the command CMD and/or the address ADD for storing an offset to the memory device 420A, the host 410A may provide an offset to the memory device 420A through the data bus.

Figure 9A:
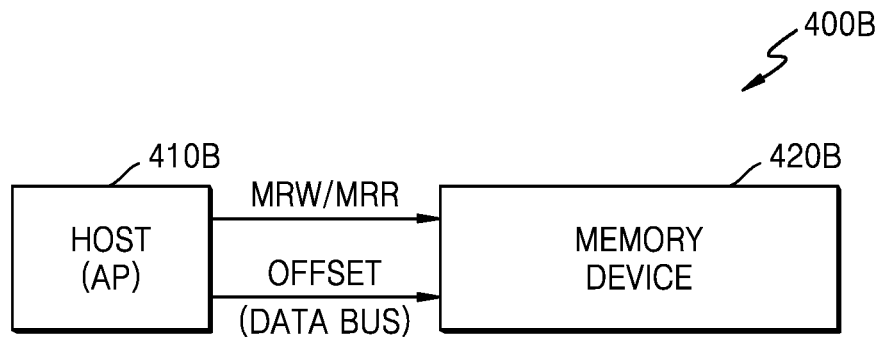
Figure 9B:
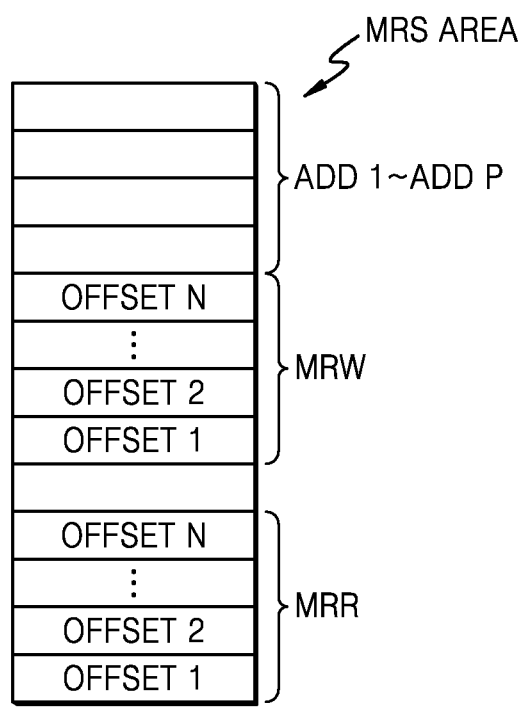

FIGS. 9A and 9B show an example of storing an offset using a control command (e.g., a mode register command) for an MRS. Referring to FIGS. 9A and 9B, the control command for the MRS may include a mode register write command MRW and a mode register read command MRR, which are used to control an operation of storing an offset. For example, a memory system 400B may include a host 410B and a memory device 420B. The host 410B may control the MRS by providing the mode register write command MRW or the mode register read command MRR to the memory device 420B.

An MRS area, which various kinds of information related to the configuration of the memory device 420B is written to or read from, may be defined. The MRS area may be defined by a certain range of addresses ADD 1 through ADD P. According to an example embodiment, another address range than the certain range may be further defined to store offsets. For example, the host 410B may control an offset to be stored in the memory device 420B by providing the mode register write command MRW and a particular range of addresses to the memory device 420B or by providing the mode register read command MRR and another particular range of addresses to the memory device 420B.

Figure 10:
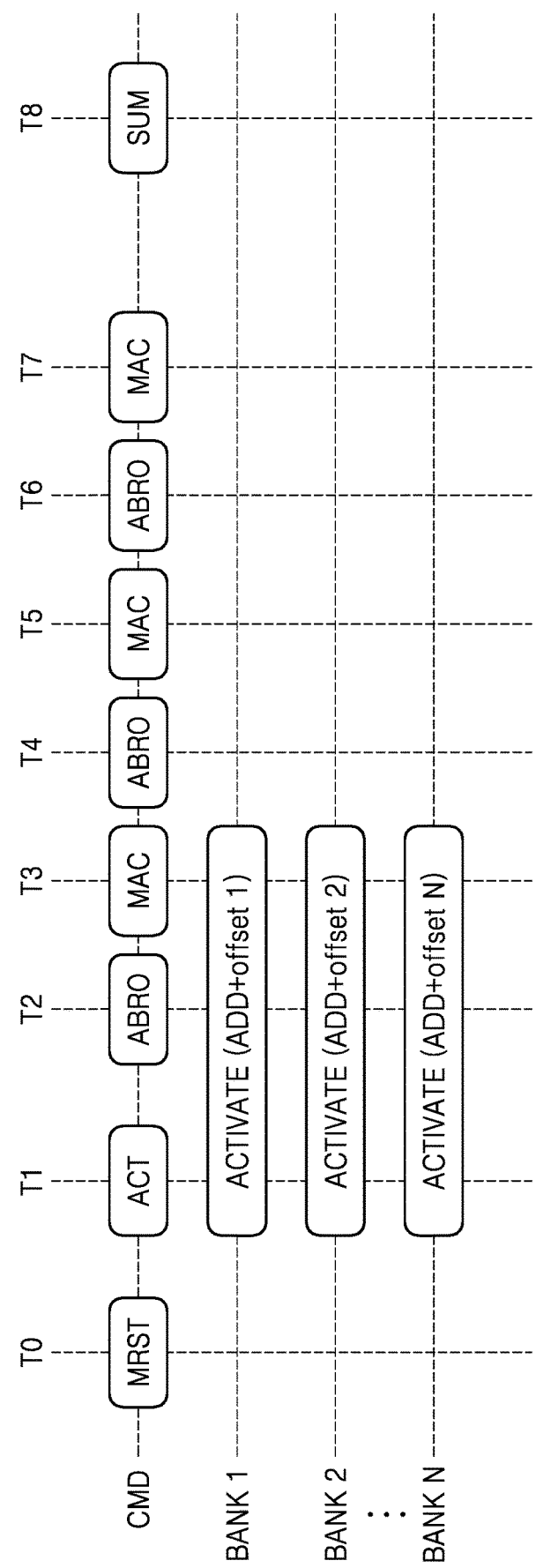
FIG. 10 is a timing diagram illustrating overall calculation processing according to an example embodiment.

FIG. 10 is a timing diagram illustrating overall calculation processing according to an example embodiment.

Referring to FIG. 10, a host (or a memory controller) may control a memory operation and a calculation processing operation by providing various commands CMD to a memory device. Various commands may be defined in relation with the calculation processing operation at times T1, T2, T3, T4, T5, T6, T7, and T8.

For example, according to the embodiments described above, an offset for each of a plurality of banks, e.g., the first through N-th banks BANK 1 through BANK N, may be calculated and stored in the memory device, and for the calculation processing, a reset command MRST may be provided to the memory device to reset a register of a PIM circuit at T0. Parallel calculation processing may be performed by a plurality of PIM circuits included in the memory device. For this operation, an active command ACT for simultaneously activating the banks of the memory device may be provided from the host to the memory device at T1. At this time, according to the embodiments described above, the memory device may perform a calculation using the address ADD from the host and an offset configured for each of the banks, thereby generating an internal address for each bank. In addition, at least one row of each bank may be activated based on the internal address, and according to the embodiments described above, rows at different positions in the banks may be activated.

A command ABRO for providing data used for the calculation processing may be provided from the host to the memory device at T2, and a command MAC for instructing to perform a calculation using the data from the host and information read from each bank may be provided to the memory device at T3. In response to the command MAC, the memory device may perform calculations in parallel using the PIM circuits. Information for a neural network computation may be efficiently read from the different rows of the banks and used.

The calculation processing using the data and the information stored in the banks may be repeatedly and sequentially performed. The host may repeatedly provide the command ABRO at T4 and T6 for providing data and the command MAC at T5 and T7 for instructing to perform a calculation to the memory device. In an example operation, the size of a row in a memory cell array of each bank may be greater than the size of data provided from the host, and accordingly, a calculation may be performed using information of a single activated row and a plurality of pieces of data from the host. For example, when the command ABRO and the command MAC are provided from the host, a calculation may be performed using data from the host and information of a portion of an activated row. Thereafter, when the command ABRO and the command MAC are newly provided from the host, a calculation may be performed using data from the host and information of another portion of the activated row.

When a series of calculation processing operations are completed by the PIM circuits as described above, the host may provide a command SUM at T8 to the memory device to receive a calculation processing result. In an example operation, in response to the command SUM, the memory device may provide the host with a sum result based on a MAC operation as a final calculation result.

A series of operations shown in FIG. 10 may be repeated a plurality of times. For example, when heterogeneous neural network computations are performed or when calculations using different characteristics tables are performed in homogeneous neural network computations, the series of operations shown in FIG. 10 may be performed after offset determination and configuration is performed according to the embodiments described above.

Figure 11:
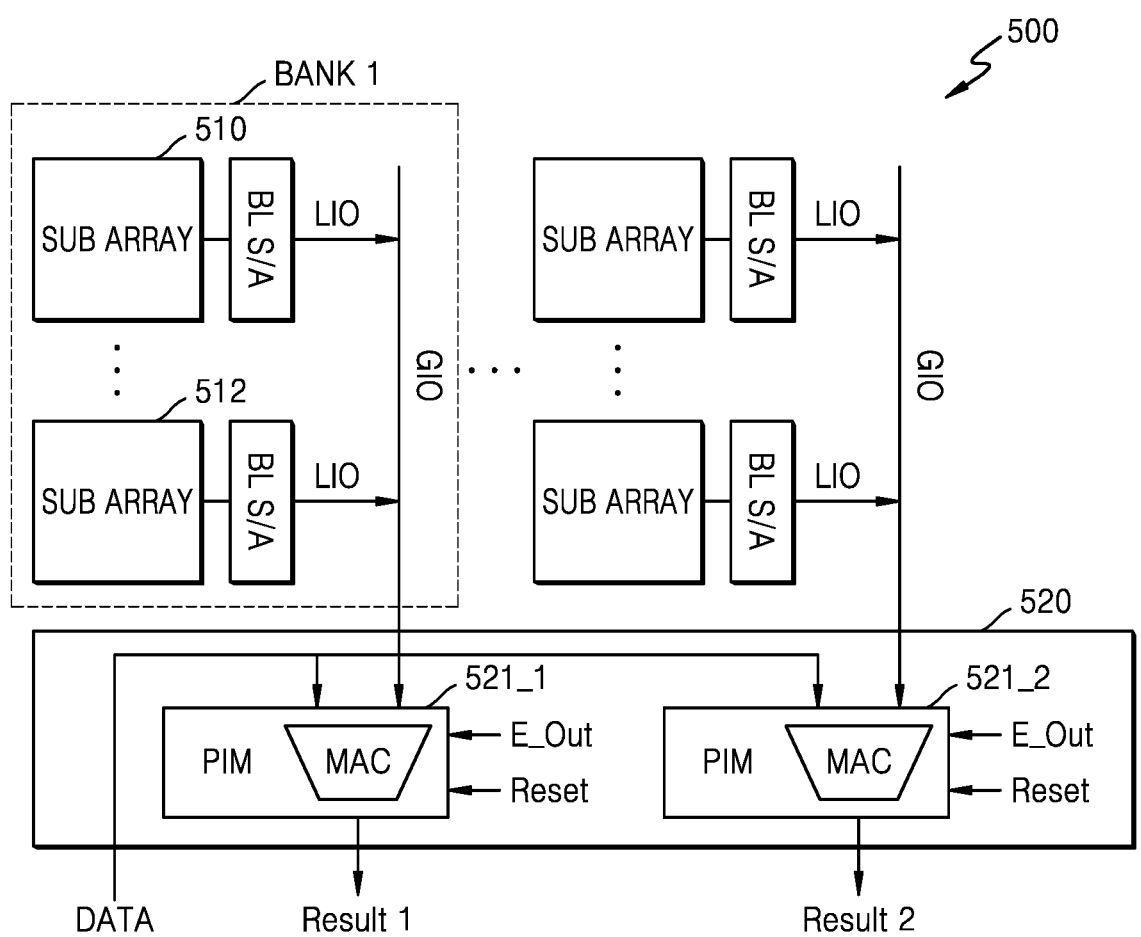
FIG. 11 is a block diagram illustrating implementation of a memory device according to an example embodiment.

FIG. 11 is a block diagram illustrating implementation of a memory device according to an example embodiment. FIG. 11 illustrates an example in which each of a plurality of banks includes a plurality of sub arrays for a memory cell array and a PIM circuit is provided for each bank.

Referring to FIG. 11, a memory device 500 may include a plurality of banks, each of which may include at least one sub array and various elements (e.g., a bitline sense amplifier BL S/A, a local input/output line LIO, and a global input/output line GIO) related to a memory operation on the sub array. For example, the first bank BANK 1 may include at least two sub arrays 511 and 512.

The memory device 500 may further include a calculation logic 520, which may include a plurality of PIM circuits, e.g., first and second PIM circuits 521_1 and 521_2 respectively corresponding to the banks. The first PIM circuit 521_1 corresponding to the first bank BANK 1 may include a MAC unit as a calculator. Each of the first and second PIM circuits 521_1 and 521_2 may further include a register that stores information used for a calculation and/or a calculation result.

The first PIM circuit 521_1 may perform calculation processing using data from a host and information read from the first bank BANK 1 and may provide a calculation result Result 1. In an example operation, various control signals are generated by the host and/or the memory device 500, and the first PIM circuit 521_1 may perform a calculation operation in response to the various control signals. For example, the first PIM circuit 521_1 may perform a reset operation on the register therein in response to a reset signal Reset and may output the calculation result Result 1 stored in the register to the host in response to a result output request E_Out.

Figure 12:
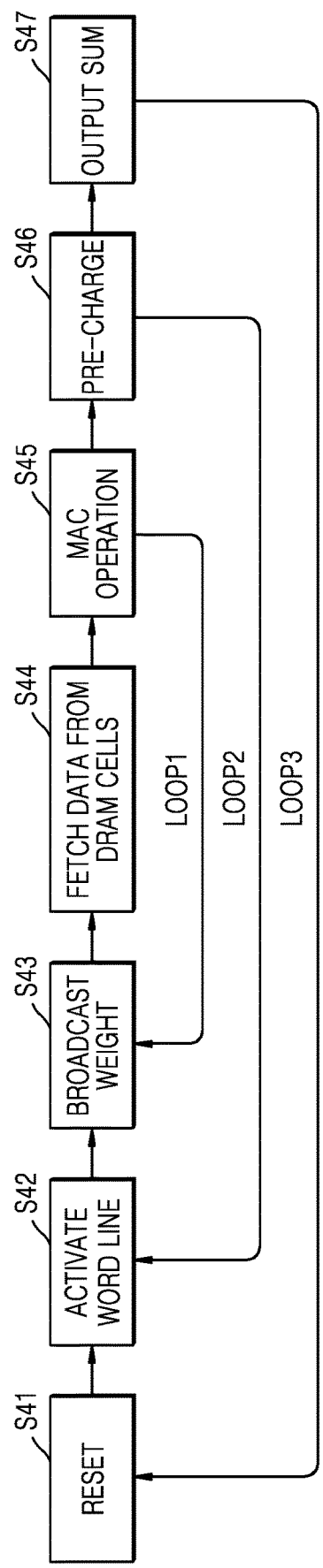
FIG. 12 is a conceptual diagram illustrating examples of various loops performed by a memory device during calculation processing, according to an embodiment.

FIG. 12 is a conceptual diagram illustrating examples of various loops performed by a memory device during calculation processing, according to an embodiment. FIG. 12 shows an example of performing operations based on various loop processes.

Before calculation processing, registers of the memory device may be reset in operation S41 and a word line in each of a plurality of banks may be activated based on an address from a host and an offset configured for each bank in operation S42, according to the embodiments described above. Rows at different positions in the banks may be activated according to the embodiments described above. Data corresponding to weight information may be transmitted (or broadcast) from the host to the banks in operation S43. Data may be read (or fetched) from memory cells (e.g., DRAM cells) of each activated row in operation S44. As in the embodiments described above, data may be read from some of the memory cells of the activated row in operation S44. Some of the memory cells of the activated row may be selected by a column address.

In the case where calculation processing is performed using a first loop Loop1, new data may be broadcast from the host after a MAC operation is performed using the data from the host and information read from some memory cells in operation S45. Thereafter, a MAC operation may be performed using the new data from the host and data read from other memory cells of the activated row. When calculation processing using the data of one row is completed through the procedure described above, the row may be pre-charged in operation S46 and a calculation result may be output in operation S47.

In the case where calculation processing is performed using a second loop Loop2, operations S41 through S45 may be sequentially performed according to the embodiments described above, and the activated row may be pre-charged in operation S46. Thereafter, to perform a calculation using information of another row, a row address (or an internal address) may be changed, and a row corresponding to the changed row address may be activated in operation S42. Thereafter, operations S43 through S46 may be sequentially performed, and a calculation result of the calculation processing using the information of a plurality of rows may be output in operation S47.

In the case where calculation processing is performed using a third loop Loop3, when calculation processing is completed with respect to one row, operations S46 and S47 may be performed. After output of a calculation result is completed, the registers of the memory device may be reset in operation S41, and operations S42 through S47 may be sequentially performed with respect to another row. In other words, when the third loop Loop3 is used, a calculation result may be provided to the host each time when a calculation is performed using the information of one row.

Figure 13:
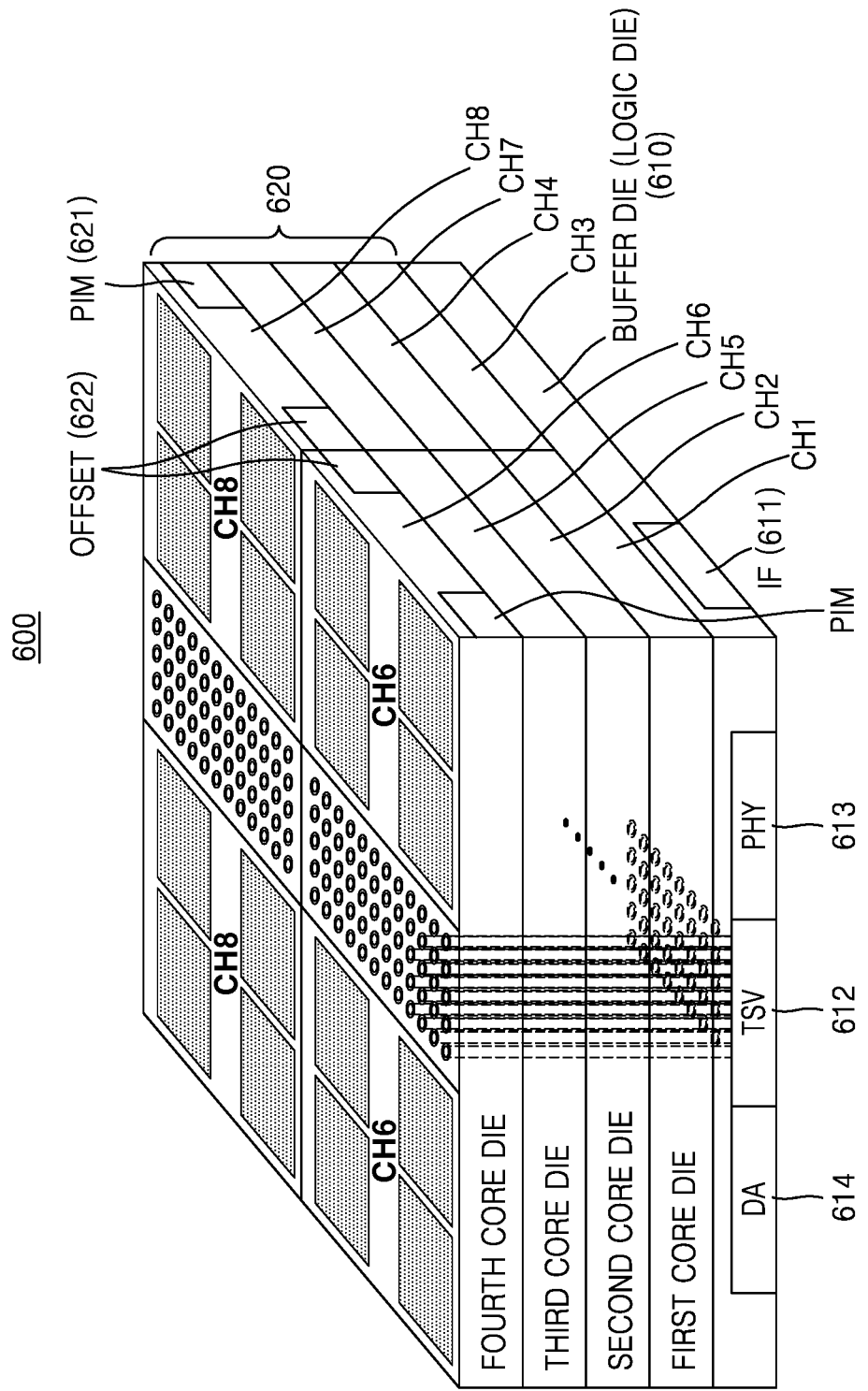
FIG. 13 is a block diagram illustrating an example of a memory device including high bandwidth memory (HBM), according to an example embodiment.

FIG. 13 is a block diagram illustrating an example of a memory device including high bandwidth memory (HBM), according to an example embodiment.

An HBM 600 may have an increased bandwidth by including a plurality of channels having an independent interface. Referring to FIG. 13, the HBM 600 may include a plurality of dies, for example, a buffer die (or a logic die) 610 and one or more core dies 620 stacked on the buffer die 610. First through fourth core dies are included in the HBM 600 in the example illustrated in FIG. 14, but the number of core dies 620 may vary.

Each of the core dies 620 may include at least one channel. In the exemplary illustrated in FIG. 13, each of the core dies 620 includes two channels, and therefore, the HBM 600 has eight channels CH1 through CH8. For example, the first core die may include the first channel CH1 and the third channel CH3, the second core die may include the second channel CH2 and the fourth channel CH4, the third core die may include the fifth channel CH5 and the seventh channel CH7, and the fourth core die may include the sixth channel CH6 and the eighth channel CH8.

The buffer die 610 may include an interface circuit 611 communicating with a host (or a memory controller and may receive a command and/or an address and data from the host through the interface circuit 611. The host may transmit a command and/or an address and data through buses provided for channels. The buses may be respectively provided for the channels, or some buses may be shared by at least two channels. The interface circuit 611 may transmit a command and/or an address and data to a channel which the host requests to perform a memory operation or a calculation processing operation. According to an example embodiment, each of the core dies 620 or each of the channels may include a PIM circuit 621 and an offset storage circuit 622. Although one PIM circuit 621 is illustrated in FIG. 13, a plurality of PIM circuits may be provided in correspondence to a plurality of banks of each channel.

The host may provide a command and/or an address and data such that at least some calculations may be performed by the HBM 600, and calculation processing may be performed by the PIM circuit 621 of a channel indicated by the host. According to an example embodiment, each channel may include a plurality of banks, and the offset storage circuit 622 may store an offset for each of the banks. For example, according to the embodiments described above, offsets having different values for the respective banks may be stored. When parallel data reading is performed on the banks, data at different positions may be read from the banks based on the offsets.

The buffer die 610 may further include a through-silicon via (TSV) region 612, a physical (PHY) region 613, and a direct access (DA) region 614. A processor controlling all operations, such as data transfer path control, of the HBM 600 may be further provided in the buffer die 610.

The TSV region 612 is a region in which TSVs for communication with the core dies 620 are formed. The PHY region 613 may include a plurality of input/output circuits for communication with an external host. For example, the PHY region 613 may include at least one port for communication with the host. The DA region 614 may directly communicate with an external tester through a conductive member, which is provided on an outer surface of the HBM 600, in a test mode of the HBM 600.

Figure 14:
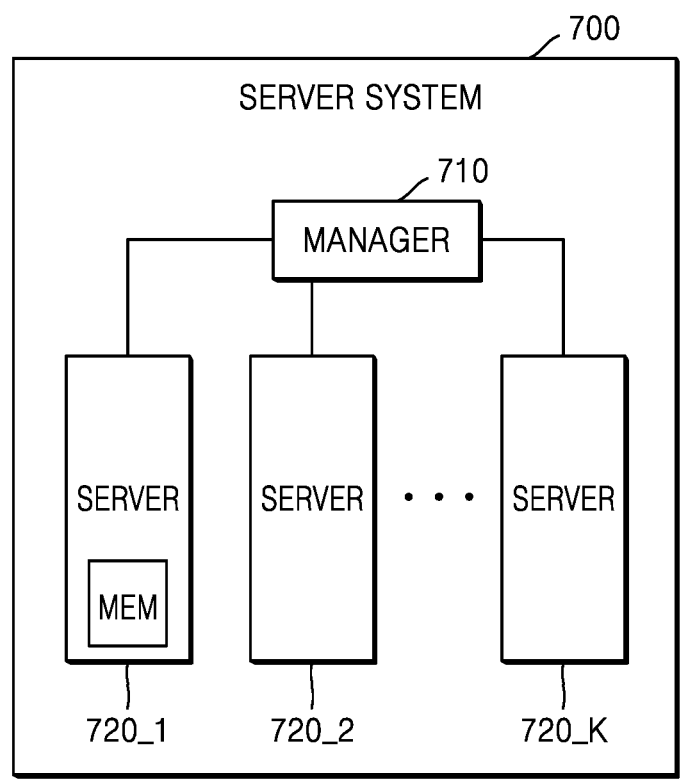
FIG. 14 is a block diagram of a server system including a data processing system, according to an embodiment.

FIG. 14 is a block diagram of a server system including a data processing system, according to an embodiment.

Referring to FIG. 14, a server system 700 may include a manager 710 and a plurality of servers 720_1, 720_2, through 720_K. Each of the servers 720_1 through 720_K may correspond to the data processing system described in the above embodiments. The servers 720_1 through 720_K may be connected with each other through a bus supporting a predetermined protocol (e.g., PCI, PCI-E, or the like). For example, the servers 720_1 through 720_K may communicate with one another through peer-to-peer (P2P) connection architecture under the control of the manager 710.

Referring to one server, e.g., the server 720_1, the server 720_1 may include a host and at least one memory device MEM, according to the embodiments described above, may perform various kinds of calculation processing according to the function thereof, and may store process results. According to an embodiment, the memory device MEM may include a plurality of banks and PIM circuits arranged in correspondence to the banks. According to the embodiments described above, the host may control the offset calculation and storage operations of the banks of the memory device MEM. In various embodiments, the server system 700 may correspond to a neural network server system, and the server 720_1 may control the memory device MEM such that at least some of a huge amount of neural network computations may be performed by the memory device MEM.

While example embodiments of the present disclosure has been particularly shown and described, it will be understood that various changes in form and details may be made therein without departing from the spirit and scope of the following claims.

What is claimed is:

1. A memory device comprising:
a memory bank including a plurality of banks, each bank of the plurality of banks including a memory cell array, and the plurality of banks including at least a first bank and a second bank, the first bank including a first memory cell array and the second bank including a second memory cell array;
a calculation logic including a plurality of processor-in-memory (PIM) circuits arranged in correspondence to the plurality of banks, the plurality of PIM circuits including at least a first PIM circuit arranged in correspondence to the first bank and a second PIM circuit arranged in correspondence to the second bank, the first bank comprising first memory information and being configured to provide the first memory information only to the first PIM circuit, and each of the plurality of PIM circuits being configured to perform a calculation processing using at least one selected from data provided from a host or memory information read from a corresponding bank among the plurality of banks; and
a control logic configured to, based on at least one of a command or an address received from the host, control a memory operation on the memory bank, and control the calculation logic to perform the calculation processing,
wherein the control logic is further configured to control in parallel at least a first reading operation from the first bank and a second reading operation from the second bank for the calculation processing,
wherein a first offset for the first bank and a second offset for the second bank having different values are respectively configured for at least the first bank and the second bank, and
wherein the memory operation is configured to:
read the first memory information from a first position in the first memory cell array and second memory information from a second position in the second memory cell array, and
provide at least the first memory information to the first PIM circuit and the second memory information to the second PIM circuit.

2. The memory device of claim 1, further comprising an offset storage circuit configured to store at least the first offset and the second offset.

3. The memory device of claim 1, wherein the first memory cell array of the first bank includes a first plurality of rows including a first row, the second memory cell array of the second bank includes a second plurality of rows including a second row, and
the first memory information from the first row and the second memory information from the second row are read in parallel according to the first offset and the second offset respectively.

4. The memory device of claim 3, wherein the memory operation is further configured to sequentially read the first memory information from the first plurality of rows in the first bank in response to the at least one of the command or the address received from the host; and
wherein a first start position of the first reading operation from the first plurality of rows is different from a second start position of the second reading operation from the second plurality of rows according to the first offset and the second offset.

5. The memory device of claim 1, further comprising an internal address generator configured to:
generate a first internal address indicating a first read position in the first memory cell array of the first bank based on a first calculation using the address from the host and the first offset, and generate a second internal address indicating a second read position in the second memory cell array of the second bank based on a second calculation using the address from the host and the second offset.

6. The memory device of claim 5, wherein the internal address generator includes a first internal address generator corresponding to the first bank, and a second internal address generator corresponding to the second bank, and the address from the host is in common among the plurality of PIM circuits.

7. The memory device of claim 1, wherein the data from the host is provided in common to the plurality of MI circuits; and the plurality of PIM circuits are configured to perform the calculation processing using the memory information and the data.

8. The memory device of claim 1, wherein the calculation processing includes a neural network computation using a weight matrix and at least a first vector and a second vector, the weight matrix includes the data from the host, the first vector includes the first memory information read from the first bank, and the second vector includes the second memory information read from the second bank.

9. The memory device of claim 8, wherein the weight matrix is provided in common to the plurality of MI circuits; and the plurality of PIM circuits perform the calculation processing using the weight matrix and at least the first vector and the second vector, the weight matrix including the data from the host provided in common from the host and the at least the first vector and the second vector including a third vector including third memory information read from a third bank among the plurality of banks.

10. The memory device of claim 1, wherein the memory device includes a high bandwidth memory (HBM) including a plurality of channels, the plurality of channels including a first channel and a second channel, the first channel includes the plurality of banks and the plurality of PIM circuits, and the second channel includes a second plurality of banks and a second plurality of PIM circuits, the second channel configured in a manner similar to that of the first channel.

11. An operating method of a memory device including a plurality of banks and a plurality of processor-in-memory (PIM) circuits arranged in correspondence to the plurality of banks, each bank of the plurality of banks including a memory cell array, the plurality of banks including at least a first bank arranged in correspondence to a first PIM circuit and a second bank arranged in correspondence to a second PIM circuit, the first bank comprising first memory information and being configured to provide the first memory information only to the first PIM circuit, the first bank including a first memory cell array, the second bank including a second memory cell array, the first memory cell array including a first plurality of rows, and the second memory cell array including a second plurality of rows, the operating method comprising:

configuring a plurality of offsets under control of a host, the plurality of offsets including a first offset for the first bank and a second offset for the second bank, and the first offset and the second offset having different values;

receiving at least one of a command or an address from the host, the at least one of the command or the address being associated with a performance of calculation processing;

generating a plurality of internal addresses based on a calculation using the address and the plurality of offsets, the plurality of internal addresses configured to access the plurality of banks, the plurality of internal addresses including a first internal address of the first memory cell array and a second internal address of the second memory cell array;

reading the first memory information from a first row of the first plurality of rows using the first internal address;

reading second memory information from a second row of the second plurality of rows using the second internal address; and performing the calculation processing in parallel using at least the first PIM circuit and the second PIM circuit using the first memory information and the second memory information, respectively.

12. The operating method of claim 11, further comprising:
receiving data from the host; and
providing the data in common to the plurality of PIM circuits, wherein the performing of the calculation processing in parallel comprises performing the calculation processing using the plurality of PIM circuits using the data and memory information, the data being provided in common from the host.

13. The operating method of claim 11, wherein the configuring of the plurality of offsets includes:
receiving at least one of the command or the address from the host, the command and the address being associated with a configuration of the plurality of offsets;
receiving the plurality of offsets from the host through a data bus, the plurality of offsets having different values respectively for the plurality of banks; and
respectively storing the plurality of offsets in respective storage circuits of the plurality of PIM circuits.

14. The operating method of claim 11, further comprising receiving a second address,
wherein the address has a first value in a first range and the second address has a second value in a second range different from the first range, the first value in the first range being associated with a performance of a memory operation on the plurality of banks, and
the configuring the plurality of offsets is performed based on the second address.

15. An operating method of a memory controller controlling a memory device, the memory device including a plurality of banks including a first bank and a second bank and a plurality of processor-in-memory (PIM) circuits including a first PIM circuit and a second PIM circuit, the plurality of PIM circuits arranged in correspondence to the plurality of banks, and the first bank comprising first memory information and being configured to provide the first memory information only to the first PIM circuit, the operating method comprising:
controlling a memory operation configured to store a plurality of items of table information in the plurality of banks, the plurality of items of table information resulting from classifying information used for a neural network computation;
calculating a plurality of offsets based on positions at which the plurality of items of table information are respectively stored in the plurality of banks, the plurality of offsets respectively having different values for the plurality of banks;
configuring the plurality of offsets in the memory device, the plurality of offsets being calculated in correspondence to the plurality of banks; and controlling a calculation operation by providing at least one of a command or an address for calculation processing to the memory device, the calculation processing being configured to perform the calculation processing using information read from different positions in the plurality of banks based on the address and the plurality of offsets.

16. The operating method of claim 15, wherein the controlling of the calculation operation comprises providing data in common to the plurality of PIM circuits, the data corresponding to a matrix in a matrix-vector calculation.

17. The operating method of claim 16, wherein the data includes a weight matrix, and input vectors include memory information read from the plurality of banks, the memory information including file information of a target to be analyzed.

18. The operating method of claim 15, further comprising resetting a register before the configuring of the plurality of offsets, the register being included in at least the first PIM circuit of the plurality of PIM circuits.

19. The operating method of claim 15, wherein the controlling of the memory operation includes controlling the memory operation to respectively store different items of the plurality of items of table information in different banks among the plurality of banks.

20. The memory device of claim 8, further comprising a memristor array, wherein the memristor array is configured to:
   store the weight matrix,
   input the first vector to the weight matrix, and
   output a result of the weight matrix operating on the first vector.

* * * * *